US010413991B2

(12) United States Patent
Streit et al.

(10) Patent No.: US 10,413,991 B2
(45) Date of Patent: Sep. 17, 2019

(54) SUPPLYING PRESSURIZED GAS TO PLASMA ARC TORCH CONSUMABLES AND RELATED SYSTEMS AND METHODS

(71) Applicant: Hypertherm, Inc., Hanover, NH (US)

(72) Inventors: Eric Streit, Lebanon, NH (US); Justin Gullotta, Brownsville, VT (US); Jesse Roberts, Cornish, NH (US)

(73) Assignee: Hypertherm, Inc., Hanover, NH (US)

( * ) Notice: Subject to any disclaimer, the term of this patent is extended or adjusted under 35 U.S.C. 154(b) by 256 days.

(21) Appl. No.: 15/392,717

(22) Filed: Dec. 28, 2016

(65) Prior Publication Data

US 2017/0188447 A1 Jun. 29, 2017

Related U.S. Application Data

(60) Provisional application No. 62/272,154, filed on Dec. 29, 2015.

(51) Int. Cl.
| | | |
|---|---|---|
| *B23K 10/00* | (2006.01) | |
| *B23K 10/02* | (2006.01) | |
| *H05H 1/34* | (2006.01) | |

(52) U.S. Cl.
CPC ............. *B23K 10/02* (2013.01); *H05H 1/34* (2013.01); *H05H 2001/3442* (2013.01); *H05H 2001/3457* (2013.01); *H05H 2001/3494* (2013.01)

(58) Field of Classification Search
CPC .......... B23K 10/00; B23K 10/06; H05H 1/34; H05H 1/36; H05H 2001/3452; H05H 2001/3494; H05B 2110/3443

(Continued)

(56) References Cited

U.S. PATENT DOCUMENTS

| | | |
|---|---|---|
| 3,018,360 A | 1/1962 | Engel |
| 3,518,401 A | 6/1970 | Mathews |

(Continued)

FOREIGN PATENT DOCUMENTS

| | | |
|---|---|---|
| DE | 202013010576 | 2/2014 |
| EP | 0875329 | 11/1998 |

(Continued)

OTHER PUBLICATIONS

Amada America Inc.,"Amada WACS System", Retrieved from the Internet at: http://www.amada.de/en/laser/wacs-system.html, printed Oct. 27, 2016, 2 pages.

(Continued)

*Primary Examiner* — Mark H Paschall
(74) *Attorney, Agent, or Firm* — Proskauer Rose LLP

(57) ABSTRACT

In some aspects, a consumable for plasma arc torch that generates a predetermined plenum pressure from a substantially constant preset gas supply pressure from a plasma arc torch power supply, where the substantially constant preset gas supply being used to support plasma generation for a selection of multiple consumable components that each generate a different plasma plenum pressure for carrying out different processes, can include a proximal portion shaped to connect to the plasma arc torch and define a plasma gas inlet region; a distal portion shaped to define a gas outlet; and a pressure-matching stage comprising a pressure wall defining at least one flow path between the gas inlet region and the gas outlet configured to establish sufficient fixed pressure drop of a flow of gas flowing through the pressure-matching stage to reduce a pressure of the flow of gas to the predetermined plenum pressure.

20 Claims, 2 Drawing Sheets

(58) Field of Classification Search
USPC .............. 219/121.5, 121.51, 121.48, 121.55, 219/121.54, 121.57
See application file for complete search history.

(56) References Cited

U.S. PATENT DOCUMENTS

| | | | |
|---|---|---|---|
| 3,914,573 | A | 10/1975 | Muehlberger |
| 4,034,250 | A | 7/1977 | Kiselev et al. |
| 4,311,897 | A | 1/1982 | Yerushalmy |
| 4,519,835 | A | 5/1985 | Gauvin et al. |
| 4,682,005 | A | 7/1987 | Marhic |
| 4,733,052 | A | 3/1988 | Nilsson et al. |
| 4,748,312 | A | 5/1988 | Hatch et al. |
| 4,914,271 | A | 4/1990 | Delzenne et al. |
| 4,967,055 | A | 10/1990 | Raney et al. |
| 5,018,670 | A | 5/1991 | Chalmers |
| 5,023,425 | A | 6/1991 | Severance, Jr. |
| 5,170,033 | A | 12/1992 | Couch, Jr. et al. |
| 5,208,441 | A | 5/1993 | Broberg |
| 5,309,683 | A | 5/1994 | Hockett |
| 5,317,126 | A | 5/1994 | Couch, Jr. et al. |
| 5,390,964 | A | 2/1995 | Gray, Jr. |
| 5,409,164 | A | 4/1995 | Delzenne et al. |
| 5,440,477 | A | 5/1995 | Rohrberg et al. |
| 5,556,562 | A | 9/1996 | Sorenson |
| 5,717,187 | A | 2/1998 | Rogozinski et al. |
| 5,796,067 | A | 8/1998 | Enyedy et al. |
| 5,844,196 | A | 12/1998 | Oakley |
| 5,860,849 | A | 1/1999 | Miller |
| 5,874,707 | A | 2/1999 | Iida et al. |
| 5,886,315 | A | 3/1999 | Lu et al. |
| 5,897,059 | A | 4/1999 | Muller |
| 5,897,795 | A | 4/1999 | Lu et al. |
| 5,994,663 | A | 11/1999 | Lu |
| 6,069,339 | A | 5/2000 | McGrath et al. |
| 6,084,199 | A | 7/2000 | Lindsay et al. |
| 6,096,993 | A | 8/2000 | Marhic et al. |
| 6,133,542 | A | 10/2000 | Dvorak et al. |
| 6,147,318 | A | 11/2000 | Marhic |
| 6,156,995 | A | 12/2000 | Severance, Jr. et al. |
| 6,163,008 | A | 12/2000 | Roberts et al. |
| 6,169,264 | B1 | 1/2001 | Marhic |
| 6,320,156 | B1 | 11/2001 | Yamaguchi et al. |
| 6,337,460 | B2 | 1/2002 | Kelkar et al. |
| 6,525,292 | B1 | 2/2003 | Girold |
| 6,657,162 | B1 | 12/2003 | Jung et al. |
| 6,703,581 | B2 | 3/2004 | Jones et al. |
| 6,713,711 | B2 | 3/2004 | Conway et al. |
| 6,717,096 | B2 | 4/2004 | Hewett et al. |
| 6,881,921 | B2 | 4/2005 | Homer-Richardson et al. |
| 6,888,092 | B2 | 5/2005 | Walters |
| 6,903,301 | B2 | 6/2005 | Jones et al. |
| 6,914,211 | B2 | 7/2005 | Brasseur et al. |
| 6,919,526 | B2 | 7/2005 | Kinerson et al. |
| 6,936,786 | B2 | 8/2005 | Hewett et al. |
| 6,946,616 | B2 | 9/2005 | Kinerson et al. |
| 6,989,505 | B2 | 1/2006 | MacKenzie et al. |
| 7,030,337 | B2 | 4/2006 | Baker et al. |
| 7,161,111 | B2 | 1/2007 | Schneider |
| 7,202,440 | B2 | 4/2007 | Hewett et al. |
| 7,326,874 | B2 | 2/2008 | Brasseur et al. |
| 7,375,302 | B2 | 5/2008 | Twarog et al. |
| 7,411,149 | B2 | 8/2008 | Schneider |
| 7,423,235 | B2 | 9/2008 | Severance, Jr. |
| 7,598,473 | B2 | 10/2009 | Cook et al. |
| 7,615,720 | B2 | 11/2009 | Sanders |
| 7,671,294 | B2 | 3/2010 | Belashchenko et al. |
| 7,737,383 | B2 | 6/2010 | Hussary et al. |
| 7,759,599 | B2 | 7/2010 | Hawley et al. |
| 8,035,055 | B2 | 10/2011 | Twarog et al. |
| 8,089,025 | B2 | 1/2012 | Sanders |
| 8,115,136 | B2 | 2/2012 | Mather et al. |
| 8,203,095 | B2 | 6/2012 | Storm et al. |
| 8,373,084 | B2 | 2/2013 | Salsich |
| 8,389,887 | B2 | 3/2013 | Liebold et al. |
| 8,395,076 | B2 | 3/2013 | Matus |
| 8,395,077 | B2 | 3/2013 | Duan et al. |
| 8,455,786 | B2 | 6/2013 | Fang |
| 8,541,710 | B2 * | 9/2013 | Brandt ...................... H05H 1/34 219/121.39 |
| 8,546,719 | B2 | 10/2013 | Warren, Jr. et al. |
| 8,575,510 | B2 | 11/2013 | Laurish et al. |
| 8,581,139 | B2 | 11/2013 | Severance, Jr. |
| 8,624,150 | B2 | 1/2014 | Simek et al. |
| 8,698,306 | B2 | 4/2014 | Yu et al. |
| 8,759,715 | B2 | 6/2014 | Narayanan et al. |
| 8,921,731 | B2 | 12/2014 | Krink et al. |
| 2002/0117482 | A1 | 8/2002 | Hewett et al. |
| 2002/0117483 | A1 | 8/2002 | Jones et al. |
| 2002/0117484 | A1 | 8/2002 | Jones et al. |
| 2003/0148709 | A1 | 8/2003 | Anand et al. |
| 2004/0169018 | A1 | 9/2004 | Brasseur et al. |
| 2004/0195217 | A1 | 10/2004 | Conway et al. |
| 2006/0016789 | A1 | 1/2006 | Mackenzie et al. |
| 2006/0289396 | A1 | 12/2006 | Duan et al. |
| 2006/0289404 | A1 | 12/2006 | Hawley et al. |
| 2006/0289406 | A1 | 12/2006 | Helenius et al. |
| 2007/0045241 | A1 | 3/2007 | Schneider et al. |
| 2008/0217305 | A1 | 9/2008 | Sanders |
| 2009/0045174 | A1 | 2/2009 | Haberler et al. |
| 2009/0152255 | A1 | 6/2009 | Ma et al. |
| 2009/0230095 | A1 | 9/2009 | Liebold et al. |
| 2009/0230097 | A1 | 9/2009 | Liebold et al. |
| 2009/0277882 | A1 | 11/2009 | Bornemann |
| 2010/0078408 | A1 | 4/2010 | Liebold et al. |
| 2010/0084381 | A1 | 4/2010 | Indraczek et al. |
| 2010/0264120 | A1 | 10/2010 | Reinke et al. |
| 2011/0284502 | A1 | 11/2011 | Krink et al. |
| 2012/0012560 | A1 | 1/2012 | Roberts et al. |
| 2012/0012565 | A1 | 1/2012 | Zhang et al. |
| 2012/0103946 | A1 | 5/2012 | Krink et al. |
| 2012/0181257 | A1 | 7/2012 | Mather et al. |
| 2012/0246922 | A1 | 10/2012 | Hussary et al. |
| 2012/0248073 | A1 | 10/2012 | Conway et al. |
| 2012/0261392 | A1 | 10/2012 | Barnett et al. |
| 2013/0043222 | A1 | 2/2013 | Leiteritz et al. |
| 2013/0043224 | A1 | 2/2013 | Leiteritz et al. |
| 2013/0087535 | A1 | 4/2013 | Barnett et al. |
| 2013/0126487 | A1 | 5/2013 | Crowe |
| 2013/0264317 | A1 * | 10/2013 | Hoffa .................... B23K 10/006 219/121.53 |
| 2014/0021172 | A1 | 1/2014 | Sanders et al. |
| 2014/0069895 | A1 | 3/2014 | Brine et al. |
| 2014/0113527 | A1 * | 4/2014 | Lindsay .................. B23K 5/00 451/5 |
| 2014/0217069 | A1 | 8/2014 | Griffin et al. |
| 2014/0217070 | A1 | 8/2014 | Pikus et al. |
| 2015/0076819 | A1 | 3/2015 | Mather et al. |
| 2015/0127137 | A1 * | 5/2015 | Brandt .................... B23K 5/00 700/166 |
| 2016/0120015 | A1 | 4/2016 | Crowe |
| 2016/0174353 | A1 | 6/2016 | Mitra et al. |

FOREIGN PATENT DOCUMENTS

| | | |
|---|---|---|
| EP | 1117279 | 7/2001 |
| EP | 1893004 | 2/2008 |
| JP | S62176685 | 8/1987 |
| JP | 4688450 | 11/2004 |
| JP | 4707108 | 7/2007 |
| JP | 2011014459 | 1/2011 |
| JP | 5744467 | 5/2012 |
| WO | 9621339 | 7/1996 |
| WO | 03089183 | 10/2003 |
| WO | 2013103466 | 7/2013 |
| WO | 2015073522 | 5/2015 |

OTHER PUBLICATIONS

Centricut catalog "2013-2014 Plasma torches and consumables", 68 pages.

Drawing of Hypertherm Part No. 120934, 2000 (redacted).

(56) References Cited

OTHER PUBLICATIONS

International Search Report and Written Opinion to corresponding PCT Application No. PCT/US2015/044884. dated Dec. 9, 2015. 15 pages.

Invitation to Pay Additional Fees for corresponding PCT application: PCT/US2015/044884, Sep. 28, 2015, 9 pages.

Komatsu America Industries, LLC: "Next Generation Twister TFP6062—300A Power Supply Units", Retrieved from the internet at: http://www.komatsuplasma.com/kai/ctd/en/tfp6062/pdf/TFP6062_Brochure.pdf, printed Oct. 27, 2016, 2 pages.

"Komatsu America Industries, LLC: "TFPL Twister Series", Retrieved from the internet at: http://fineplasma.com/kai/ctd/en/tfp/pdf/eTFP.pdf, printed Oct. 27, 2016, 6 pages".

Thermal Dynamics XT™-300 Brochure, May 7, 2007,http://www.mitausteel.lv/wp-content/uploads/2013/I I/V- XT300-Torch.pdf, 6 pages.

Thermal Dynamics, "XT-301 Automated Plasma Cutting Torch", retrieved from the internet at: http://victortechnologies.com/IM_Uploads/DocLib_5849_XT-301%20Torch%20for%20use%20w%20Merlin%201000%20Brochure%20(63-2524)_Nov2005.pdf: Thermadyne.

Trumpf Inc.,"TruLaser: Cost-effective culling through thick and thin", Retrieved from the internet at: http://www.us.trumpf.com/fileadmin/DAM/us.trumpf.com/Brochures/2D_Laser/TruLaser_US_10-12.pdf, printed Oct. 26, 2016, 32 pages.

Welding Magazine, "Plasma cutting system for mild steel",Oct. 2008, p. 34 retrieved from the internet at: http://search.proquest.com/professional/printviewfile?accountid=157282.

Welding Magazine, "Plasma cutting system and products: new and or upgraded plasma cutting systems and torches have been designed to offer increased flexibility and to boost performance and productivity". Retrieved from the internet at: http://search.proquest.com/professional/printviewfile?accountid=157282, Apr. 2007,pp. 36-38.

\* cited by examiner

SUPPLYING PRESSURIZED GAS TO PLASMA ARC TORCH CONSUMABLES AND RELATED SYSTEMS AND METHODS

RELATED APPLICATIONS

This application claims the benefit of U.S. Provisional Application No. 62/272,154, filed Dec. 29, 2015 and titled "Nominal Input Pressure to Plasma Consumables and Plasma Gouging Consumables," the contents of which are hereby incorporated by reference in their entirety.

TECHNICAL FIELD

This application relates generally to plasma arc torches, and more specifically to supplying pressurized gas to plasma arc torch consumables and related systems and methods.

BACKGROUND

Thermal processing torches, such as plasma arc torches, are widely used in the heating, cutting, gouging, and marking of materials. A plasma arc torch generally includes an electrode, a nozzle having a central exit orifice mounted within a torch body, electrical connections, passages for cooling, and passages for arc control fluids (e.g., plasma gas). A swirl ring can be used to control fluid flow patterns in the plasma chamber formed between the electrode and the nozzle. In some torches, a retaining cap can be used to maintain the nozzle and/or swirl ring in the torch body. In operation, the plasma arc torch produces a plasma arc, which is a constricted jet of an ionized gas with high temperature and sufficient momentum to assist with removal of molten metal. Power used to operate plasma arc torches can be controlled by a power supply assembly of a plasma operating system. The power supply can include a plurality of electronic components configured to control and supply an operational current to the plasma arc torch, the gas flows provided to the plasma arc torch, and, in some cases, motion of the plasma arc torch.

Some plasma arc torch consumable components require different gas pressures to be provided to the torch by the power supply based on their operation, purpose, design, etc. For example, plasma gouging operations typically use a significantly lower pressure plasma gas than some plasma cutting operations. This means that a variable gas pressure regulator, either manual or auto-adjusting, is traditionally used to adjust the gas pressure in the power supply system. Such regulators can be complex and unreliable. Additionally, manual adjustment, for example, by an operator, can also be prone to error by which the operator incorrectly sets the plasma gas pressure for a particular consumable or operation.

SUMMARY

In some aspects, plasma arc torch systems can include a plasma arc torch configured to receive at least one consumable; and a power supply having a gas pressure regulator for providing pressurized gas to the torch, the gas pressure regulator being set to provide a substantially constant preset gas supply pressure to the torch for use with a plurality of different consumables that generate a predetermined plenum pressure from a set input supply pressure, the different consumables being configured for carrying out different processes, where at least one of the different consumables includes a proximal portion shaped to connect to the plasma arc torch and define a gas inlet region; a distal portion shaped to define a gas outlet; and a pressure-matching stage comprising a pressure wall defining at least one flow path between the gas inlet region and the gas outlet configured to establish sufficient fixed pressure drop of a flow of gas flowing through the pressure-matching stage to reduce a pressure of the flow of gas to the predetermined plenum pressure.

In some aspects, a consumable for a plasma arc torch that generates a predetermined plenum pressure from a substantially constant preset gas supply pressure from a plasma arc torch power supply, where the substantially constant preset gas supply being used to support plasma generation for a selection of multiple consumable components that each generate a different plasma plenum pressure for carrying out different processes, can include a proximal portion shaped to connect to the plasma arc torch and define a plasma gas inlet region; a distal portion shaped to define a gas outlet; and a pressure-matching stage comprising a pressure wall defining at least one flow path between the gas inlet region and the gas outlet configured to establish sufficient fixed pressure drop of a flow of gas flowing through the pressure-matching stage to reduce a pressure of the flow of gas to the predetermined plenum pressure.

Embodiments can include one or more of the following features.

In some embodiments, the at least one flow path of the pressure-matching stage can include a set of metering holes located between the gas inlet region and the gas outlet. The set of metering holes can be oriented to be axially and circumferentially offset from a set of swirl ring openings.

In some embodiments, the substantially constant preset gas supply pressure can be set by a pressure regulator. In some embodiments, the fixed pressure drop can be at least about 15 psi. The fixed pressure drop can be at least about 45 psi. In some cases, the fixed pressure drop can correspond to a desired operating characteristic of the plasma arc torch.

In some embodiments, the consumable can be a nozzle. In some embodiments, the consumable can be shaped to seat in a swirl ring and engage a surface that is positioned proximally with respect to a set of swirl ring openings in the swirl ring. In some embodiments, the gas outlet can be a nozzle bore.

In some aspects, a nozzle for a plasma arc torch that generates a selected plenum pressure from a substantially fixed supply pressure input provided by a power supply, where the substantially fixed supply pressure being used to support plasma generation for a selection of different nozzles that each generate a different plasma plenum pressure to complete different material processing procedures, can include a distal section defining a bore; and a proximal section shaped to matingly engage a swirl ring, the proximal section defining an outer plenum flow surface shaped to complement an inner plenum flow surface of the swirl ring to together define a pressure metering chamber, the proximal section defining one or more metering orifices fluidly connecting the pressure metering chamber to an interior surface of the nozzle in fluid communication with the bore.

Embodiments can include one or more of the following features.

In some embodiments, the one or more metering orifices can be sized to induce a predefined pressure drop between the pressure metering chamber and the interior surface of the nozzle. In some embodiments, the nozzle can be a gouging nozzle and the one or more metering orifices can include 4 holes. In some embodiments, the one or more metering orifices can be canted about a central axis of the nozzle. In some embodiments, the outer plenum flow surface defines a recess formed about the nozzle. In some cases, the recess can include a substantially annular channel formed about the nozzle.

In some embodiments, the proximal section can be shaped to fit within a portion of the swirl ring. The proximal section of the nozzle can include a rear sealing portion to form a fluid seal against the swirl ring. The proximal section of the nozzle can include a forward sealing portion to form a fluid seal against a complementary retaining cap.

Embodiments described herein can have one or more of the following advantages.

In some aspects, the systems and methods described herein can be more efficient and easier to use than some conventional systems, such as those having adjustable pressure regulators in the power supply. For example, pressure regulators in the power supply typically add complexity and cost to the system. Additionally, pressure regulators in the power supply allow for undesirable lag between the power supply and torch, which decreases the robustness and dependability of the plasma torch system. However, the consumables and torch configurations described herein (e.g., the pressure matching stage of the consumable) can reduce the need for the costly regulator components by being configured to generate a variety of different plasma plenum pressures from a constant input pressure provided from the power supply.

Additionally, control algorithms used to operate the pressure regulators can also be complex and unreliable under a variety of operating conditions. This unreliability can result in suboptimal performance and cuts, wear on the system and valve, and additional points of failure. Whereas, the systems and methods described herein in which the adjustable pressure regulator is generally obviated due to plasma pressure being set at the torch using the consumable can be used to alleviate these insufficiencies, which can reduce warranty issues for gas control systems. As a result, the systems and methods described herein can also reduce costs for users and/or manufacturers.

In some cases, the systems and methods herein can also be easier to use than some conventional systems. For example, rather than an operator having to manually set up a system by selecting a proper gas pressure (e.g., looking up a pressure in a cut chart and turning a dial or switch to set a plasma gas pressure), which can be prone error, the consumables described herein having a dedicated pressure-matching stage can simply be installed into a torch, and then upon use, the plasma gas is delivered to the plenum at the predetermined desired plasma gas pressure automatically. Thus, the systems described herein can reduce (e.g., minimize) incorrect or improper system set ups. As a result, better cutting performance can be achieved. The systems and methods described herein can also be used to improve consumable tunability and specialization.

In a specific example application, the systems and methods described herein can allow for optimized gouging capability to be brought to even lower amperage systems where auto-gas regulation to switch between cutting and gouging modes is not currently available. Additionally, the concepts described herein can be integrated into a cartridge design to enhance ease of use when switching between cutting and gouging modes and allow more precise tunability in consumables.

In order to attain consistent cutting and gouging performance, a system can be designed such that it can maintain the following process gas flow characteristics:

a) Pressure at nozzle orifice;

b) Sufficiently large rate of change of pressure (delta pressure/delta time (dp/dt)) at electrode for fast electrode-nozzle separation; and c) Swirl strength.

The swirl ring can typically be a shared part for both cutting and gouging. The hole pattern of the flow paths defining the flow-matching section can be a unique offset from center hole pattern that provides the following function:

a) Optimized swirl strength for both cutting and gouging pressures/flow-rates; and b) Sufficiently large cross-sectional area in order to minimize delta p between electrode chamber and plenum.

In some embodiments (e.g., for a gouging nozzle/process application), these concepts described herein can be for a gouging nozzle that is designed to collect the gas flowing through the swirl ring holes and meter the flow entering the plasma chamber. This design induces a large pressure drop between the torch lead line and the plenum/electrode chamber. A specific orifice orientation and cross-sectional area can be used to achieve the desired process gas pressure and swirl strength. By controlling and adjusting the cross-sectional area and placement of these orifices, one is able to meter and manage the pressure drop and ultimately the pressures in the system to what is desired for a given process. It is understood that while holes and orifices in nozzles and swirl rings are described in detail herein, these descriptions are merely examples. Other approaches are being considered and examined and may be used in place of or in conjunction with the orifices described herein in detail.

DETAILED DESCRIPTION

In some aspects, the systems and methods described herein can include torch consumables having a plenum pressure-setting portion that is configured to receive a consistent gas pressure from a plasma arc system power supply and reduce the pressure to a desired, predetermined plenum pressure desired for carrying out a material processing operation with the given consumable. Using the consistent gas pressure and consumables with their own pressure-setting portion, consumables can simply be installed into a torch and used without requiring additional gas pressure adjustments or set up.

Figure 1:
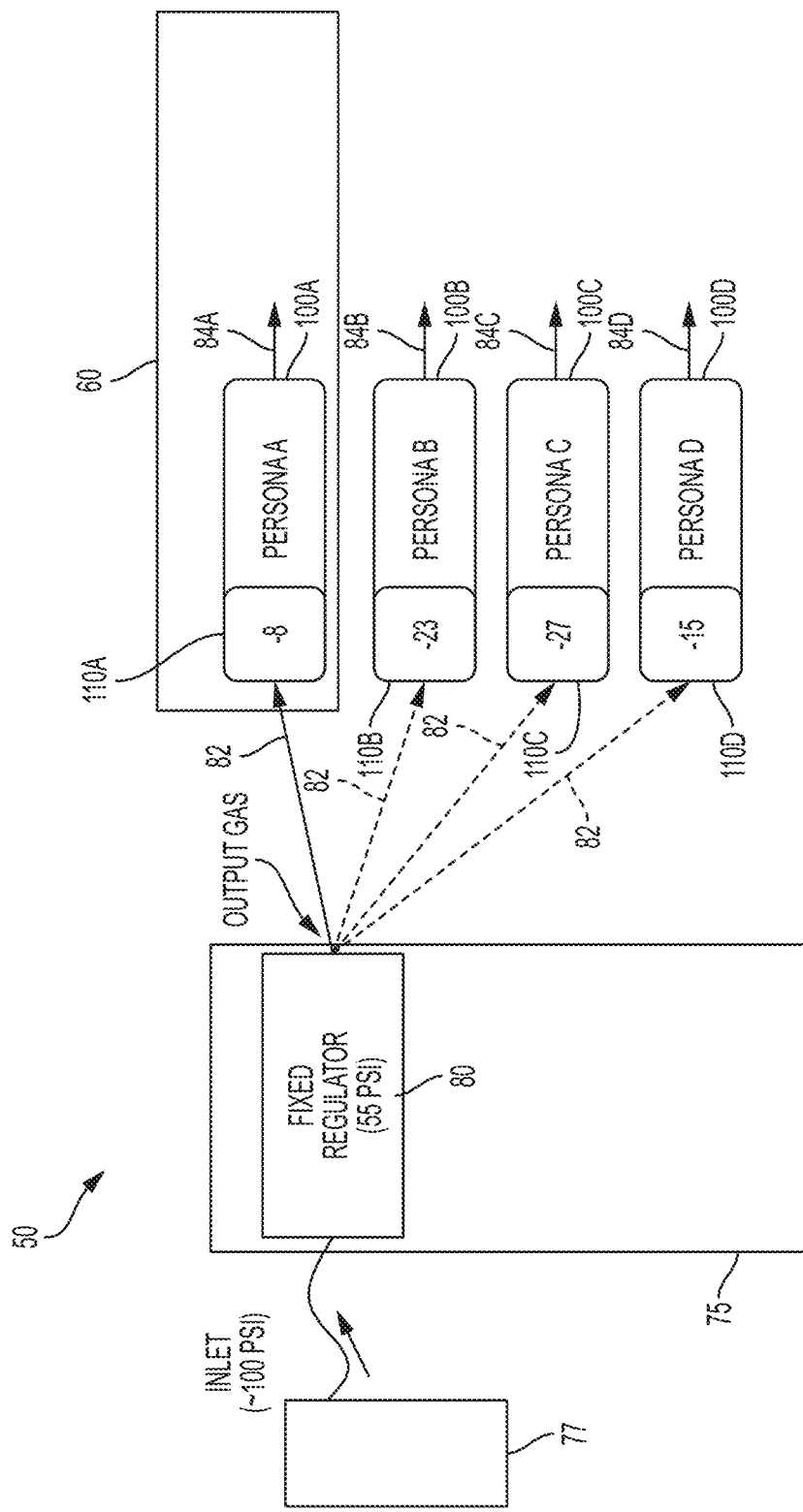
FIG. 1 is a schematic diagram of an example plasma torch system providing a consistent gas pressure to a series of consumable types, each of the consumables having a pressure-reducing component to generate a different plenum pressure.

For example, referring to the schematic diagram of FIG. 1, in some aspects, a plasma arc torch system 50 can include a plasma arc torch 60 fluidly and electrically connected to a control system (e.g., a power supply) 75. The power supply 75 is configured to provide electricity and pressurized gas to the torch 60 for generating a plasma arc. For example, the power supply 75 can include a gas pressure control (e.g., a regulator) 80 that provides pressurized gas to the torch 60. The gas pressure regulator 80 can be set to provide a consistent (e.g., substantially constant, preset, substantially fixed) gas supply pressure 82 to the torch. In some embodiments, the gas supply pressure is preset (e.g., predetermined) for use for multiple consumable sets 100A, 100B, 100C, 100D and for different material processing procedures. In some embodiments, the different consumables can each be configured for carrying out a certain cutting persona with limited action by the system operator. A "cutting persona" is a set of parameters for a plasma arc cutting system that are customized for a particular kind of cut. For example, one user may want to cut as fast as possible and sacrifice consumable life. For this type of cut, a cutting persona that establishes a high current and gas flow can be desirable. Another user, such as one who is using a computer numeric controller ("CNC")—controlled table mounted system, may want to select a cutting persona optimized for long life or fine cutting. For this type of cut, a cutting persona that establishes a low current and/or gas flow rate can be desirable. In some embodiments, the consumable can include a nozzle (e.g., a cutting nozzle or a gouging nozzle), a cartridge, a shield, or a cartridge assembly including one or more individual components.

Gas can be provided to the regulator 80 from a gas source 77, such as a high pressure gas supply line. In some cases, the substantially constant preset gas supply pressure is provided by a line pressure provided to the plasma arc torch power supply from the gas source 77.

As depicted, in some cases, the power supply 75 can be configured to provide the consistent gas pressure to the different consumables 100A, 100B, 100C, 100D and the consumables can then generate a predetermined plenum pressure 84A, 84B, 84C, 84D from the supply pressure for plasma generation to carry out different processes, such as fine cutting, gouging, etc. Thus, the various consumables can be installed into the torch 60 for a material processing operation without requiring an adjustment of gas pressure by the operator and/or the power supply/at the system. To generate the predetermined plenum pressure, as discussed below, the consumables can each have a pressure-setting portion (e.g., pressure-matching portion (e.g., a pressure-matching stage)) 110A, 110B, 110C, 110D that reduces the gas pressure within the consumable from the set pressure 82 (e.g., 55 psi) of the gas provided by the power supply to the varied/desired plenum pressure(s) 84A, 84B, 84C, 84D.

As depicted in FIG. 1, by way of example only, gas can be provided to the power supply at approximately 100 pounds per square inch (psi) from a gas source. The pressure regulator 80 can set the pressure of the gas to approximately 55 psi to consistently provide plasma gas to a variety of consumables at 55 psi. The pressure-matching stages 110A, 110B, 110C, 110D of each consumable then further reduce the plasma gas pressure to the desired plenum pressure for carrying out an intended operation. As illustrated, consumable 100A can have a pressure-matching stage 110A that decreases the pressure by approximately 8 psi to generate a plasma plenum pressure 84A of approximately 47 psi. Consumable 100B can have a pressure-matching stage 110B that decreases the pressure by approximately 23 psi to generate a plasma plenum pressure 84B of approximately 28 psi. Consumable 100C can have a pressure-matching stage 110C that decreases the pressure by approximately 27 psi to generate a plasma plenum pressure 84C of approximately 28 psi. Consumable 100D can have a pressure-matching stage 110D that decreases the pressure by approximately 15 psi to generate a plasma plenum pressure 84D of approximately 40 psi.

Various structural features and configurations can be used to generate a pressure-dropping flow blockage to obstruct gas entering the consumable and reduce its pressure. For example, referring to FIGS. 2 and 3, a consumable (e.g., a nozzle) 100 can include a proximal portion 120 and a distal portion 140. The proximal portion 120 can be shaped to connect to the plasma arc torch and define a plasma gas inlet region 130. In some examples, the consumable is shaped to engage (e.g., seat or fit within) a swirl ring 300 and engage a surface that is positioned proximally with respect to a set of swirl ring openings 310 in the swirl ring. The swirl ring openings 310, as indicated by the dashed lines in the figures, can be canted about the longitudinal axis of the torch. In some examples, the proximal section 120 extends into the swirl ring 300. The distal portion 140 can be shaped to define a portion of a plasma plenum and a gas outlet (e.g., exit orifice, nozzle bore) 142.

The consumable also includes a pressure-matching stage 150 to reduce the pressure of incoming plasma gas from the consistent gas supply pressure from the regulator to a predetermined plenum pressure. The pressure-matching stage 150 can include a blockage (e.g., a flow obstruction (e.g., a plasma gas flow blocking wall)) that intercepts and limits plasma gas flowing from the torch body into the nozzle to reduce the pressure of the gas that enters the nozzle. This flow blocking wall reduces a cross-sectional area of a portion of the gas flow path from the regulator to the plenum. This reduction in cross-sectional area induces a specific/targeted pressure drop. As a result of the flow blocking wall, high pressure plasma gas delivered to the torch can undergo a pressure reduction as it enters the nozzle, reducing the pressure to a desired and predetermined plasma pressure.

For example, the pressure-matching stage 150 can include a pressure wall defining at least one flow path (e.g., pressure-loss inducing hole) between the gas inlet region 130 and the gas outlet 142. The flow path 122 is configured to establish a fixed pressure drop (e.g., a predetermined set pressure drop) of a flow of gas flowing through the pressure-matching stage that is sufficient to reduce the pressure of the flow of gas to the predetermined plenum pressure (e.g., a selected plasma pressure) desired for a particular application. The fixed pressure drop can be any of various amounts to reduce the incoming gas pressure to a desired plenum pressure and can correspond to a desired operating characteristic of the plasma arc torch. The fixed pressure drop can be about 80 psi to about 35 psi (e.g., about 85 psi to about 50 psi (e.g., about 65 psi)). In some embodiments, the pressure drop can be at least 15 psi, at least 30 psi, at least 45 psi, or more.

In some embodiments, the at least one flow path 122 is in the form of a set of one or more openings (e.g., orifices, holes (e.g., metering holes)) disposed between the gas inlet region 130 and the gas outlet 142. For example, a nozzle can include a series of holes 122 formed around the proximal region 120 that permit the plasma gas blocked by the flow blocking wall to pass into the inside of the nozzle to reduce to the desired plenum pressure. In some cases, the holes 122 can be oriented to be axially and circumferentially offset from a set of swirl ring openings 310. Offsetting the holes 122 from the swirl ring openings 310 can help distribute gas around the nozzle and reduce flow variation due to axial misalignment.

The configuration of the holes, for example, the size, location, and number of holes can be based on the intended pressure drop to be induced. For example, the pressure-matching stage can include about 4 holes to about 24 holes (e.g., about 8 holes to about 16 holes (e.g., about 12 holes)). In some examples, a gouging nozzle can include four holes. The holes can have any of various sizes (e.g., widths (e.g., diameters)). For example, the holes can have a width (e.g., diameter) that is about 0.015 inches to about 0.060 inches. Additionally, the total cross-sectional area of the flow paths formed by the holes can be about 0.002 square inches to about 0.05 square inches. By way of example, a nozzle can include a pressure-matching stage in the form of 6 holes distributed around its proximal region, where each hole is about approximately 0.021 inches wide and the resulting pressure reduction is approximately 30 psi. In some embodiments, the holes are canted (e.g., angled) about a central axis of the nozzle. For example, the holes can be canted at an angle of about 15 degrees to about 30 degrees.

Figure 3:
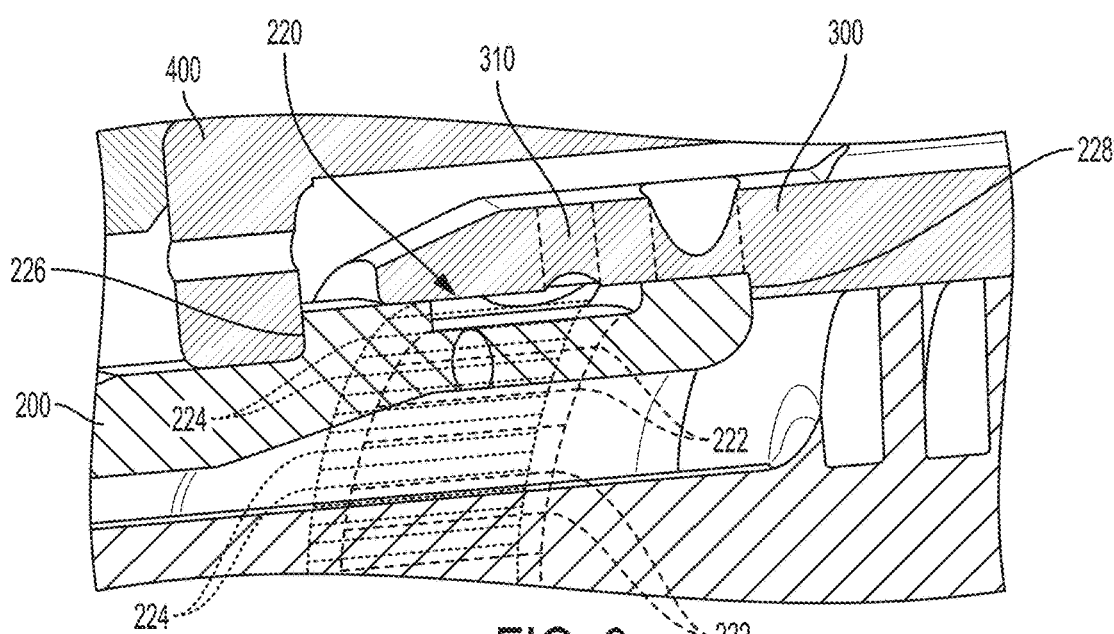
FIG. 3 is a cross-sectional view of an example plasma arc torch having a consumable component defining a pressure metering chamber that generates a selected plenum pressure from a substantially fixed supply pressure input provided by a power supply.

Referring more specifically to FIG. 3, in some embodiments, a consumable (e.g., nozzle) 200 can include a pressure metering chamber 220. The pressure metering chamber 220 can be partially defined by the nozzle 200 and partially defined by the swirl ring 300 in which the nozzle is matingly engaged. For example, a proximal section of the nozzle can define an outer plenum flow surface 222 shaped to complement an inner plenum flow surface 224 of the swirl ring that together define the pressure metering chamber 220, the proximal section defining one or more metering orifices fluidly connecting the pressure metering chamber to an interior surface of the nozzle in fluid communication with the bore.

In some embodiments, as depicted in FIG. 3, the outer plenum flow surface 222 defines a recess formed about the nozzle. In some cases, the recess includes a substantially annular channel formed about the nozzle. For example, the recess and the inner plenum flow surface of the swirl ring together form the pressure metering chamber 220.

Figure 2:
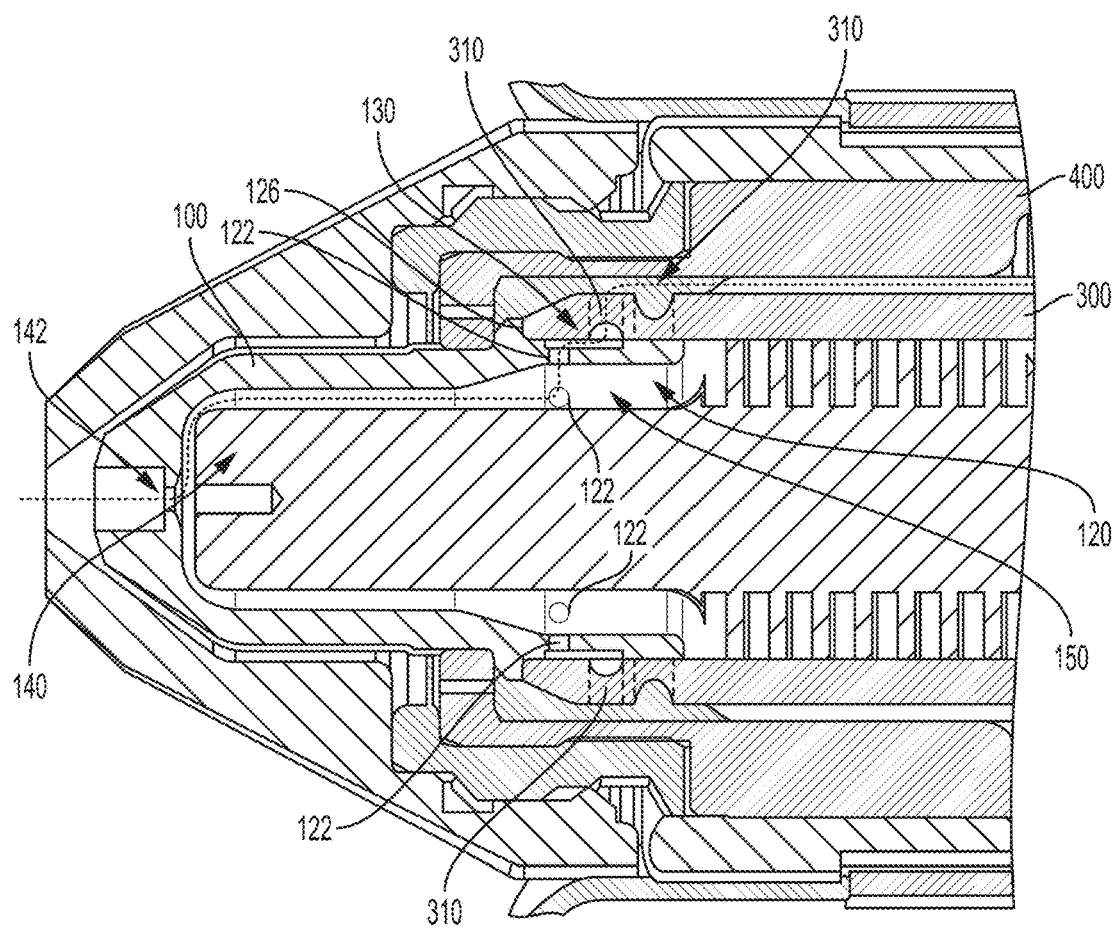
FIG. 2 is a cross-sectional view of an example plasma arc torch having a consumable component with a pressure matching stage to reduce a consistent gas input pressure to a predetermined plasma plenum pressure for the consumable component.

The nozzle, swirl ring, and complementary retaining cap can include mating features by which they can engage one another. For example, as depicted in FIG. 2, the nozzle can include a step feature 126 against which the swirl ring 300 can seat. As depicted in FIG. 3, a nozzle can include a forward sealing portion 226 to form a fluid seal against a complementary retaining cap 400. For example, a metal-to-metal surface seal can be used. The nozzle can also include a rear sealing portion 228 to form a fluid seal against the swirl ring 300. For example, the swirl ring can define a surface (e.g., a recess (e.g., a step recess)) against which the rear sealing portion can seat.

In some embodiments, the pressure matching stage can also reduce the inlet pressure by "spilling off" some of the air to atmosphere or elsewhere in the stack up/torch. For instance not only is there a pressure drop but there is a vent or separate path besides the plenum where a portion of the gas is directed to further adjust/manipulate the pressure.

While some of the examples above have been described with respect to implementing the methods and systems herein into plasma torch nozzles, other embodiments are possible. For example, as mentioned above, the consumables having pressure-limiting features can include cartridges. In some aspects, different cartridges can accept the same (e.g., consistent or constant) gas pressure from the plasma power supply and produce different plenum pressures. In some embodiments, the different gas pressures can be achieved using a built-in, fixed, predetermined pressure reducing or matching component that reduces the nominal input pressure to whatever operating pressure that particular cartridge needs. Because the pressure and flow of a particular cartridge is typically fixed, a flow path (e.g., a simple orifice) might be used for this purpose. This flow path may include a pressure matching stage as described herein which induces a pressure drop in the gas flow between the system and the plenum, tailoring the pressure value for the given process/style of cartridge.

While various embodiments have been described herein, it should be understood that they have been presented and described by way of example only, and do not limit the claims presented herewith to any particular configurations or structural components. Thus, the breadth and scope of a preferred embodiment should not be limited by any of the above-described exemplary structures or embodiments, but should be defined only in accordance with the following claims and their equivalents.

What is claimed:

1. A consumable for a plasma arc torch that generates a predetermined plenum pressure from a substantially constant preset gas supply pressure from a plasma arc torch power supply, the substantially constant preset gas supply being used to support plasma generation for a selection of multiple consumable components that each generate a different plasma plenum pressure for carrying out different processes, the consumable comprising:
    a proximal portion shaped to connect to the plasma arc torch and define a gas inlet, wherein the gas inlet is fluidly connected to the substantially constant preset gas supply;
    a distal portion shaped to define a gas outlet, wherein the gas outlet is fluidly connected to the gas inlet by at least one flow path, the flow path including at least the gas inlet, the gas outlet, and a pressure matching stage, the pressure-matching stage defined between the gas inlet and the gas outlet,
    the pressure-matching stage comprising a pressure wall and at least one metering hole
    wherein the at least one metering hole and the pressure wall are configured to reduce a cross sectional flow area of the at least one flow path, thereby establishing sufficient fixed pressure drop of a flow of gas flowing through the pressure-matching stage to reduce the substantially constant preset gas supply pressure of the flow of gas to the predetermined plenum pressure.

2. The consumable of claim 1 wherein the at least one flow path of the pressure-matching stage comprises a set of metering holes located between the gas inlet region and the gas outlet.

3. The consumable of claim 2 wherein the set of metering holes are oriented to be axially and circumferentially offset from a set of swirl ring openings.

4. The consumable of claim 1 wherein the substantially constant preset gas supply pressure is set by a pressure regulator.

5. The consumable of claim 1 wherein the fixed pressure drop is at least about 15 psi.

6. The consumable of claim 1 wherein the fixed pressure drop is at least about 45 psi.

7. The consumable of claim 1 wherein the fixed pressure drop corresponds to a desired operating characteristic of the plasma arc torch.

8. The consumable of claim 1 wherein the consumable comprises a nozzle.

9. The consumable of claim 1 wherein the consumable is shaped to seat in a swirl ring and engage a surface that is positioned proximally with respect to a set of swirl ring openings in the swirl ring.

10. The consumable of claim 1 wherein the gas outlet is a nozzle bore.

11. A nozzle for a plasma arc torch that generates a selected plenum pressure from a substantially fixed supply pressure input provided by a power supply, the substantially fixed supply pressure being used to support plasma generation for a selection of different nozzles that each generate a different plasma plenum pressure to complete different material processing procedures, the nozzle comprising:
   a distal section defining a bore; and
   a proximal section shaped to matingly engage a swirl ring, the proximal section defining an outer plenum flow surface shaped to complement an inner plenum flow surface of the swirl ring to together define a pressure metering chamber, the proximal section defining one or more metering orifices;
   the distal section and the proximal section being fluidly connected by at least one flow path, the at least one flow path including at least the distal section, the proximal section, and the pressure metering chamber;
   the pressure metering chamber comprising one or more pressure walls,
   wherein the one or more metering orifices and the one or more pressure walls are configured to reduce a cross sectional flow area of the at least one flow path, thereby establishing sufficient fixed pressure drop of a flow of gas flowing through the pressure metering chamber to reduce the substantially fixed supply pressure of the flow of gas to the selected plenum pressure.

12. The nozzle of claim 11 wherein the one or more metering orifices are sized to induce a predefined pressure drop between the pressure metering chamber and the interior surface of the nozzle.

13. The nozzle of claim 11 wherein the nozzle comprises a gouging nozzle and the one or more metering orifices comprise 4 holes.

14. The nozzle of claim 11 wherein the proximal section is shaped to fit within a portion of the swirl ring.

15. The nozzle of claim 11 wherein the one or more metering orifices are canted about a central axis of the nozzle.

16. The nozzle of claim 11 wherein the outer plenum flow surface defines a recess formed about the nozzle.

17. The nozzle of claim 16 wherein the recess comprises a substantially annular channel formed about the nozzle.

18. The nozzle of claim 11 wherein the proximal section of the nozzle comprises a rear sealing portion to form a fluid seal against the swirl ring.

19. The nozzle of claim 11 wherein the proximal section of the nozzle comprises a forward sealing portion to form a fluid seal against a complementary retaining cap.

20. A plasma arc torch system comprising:
   a plasma arc torch configured to receive at least one consumable; and
   a power supply having a gas pressure regulator for providing pressurized gas to the torch, the gas pressure regulator being set to provide a substantially constant preset gas supply pressure to the torch for use with a plurality of different consumables that generate a predetermined plenum pressure from a set input supply pressure, the different consumables being configured for carrying out different processes,
   at least one of the different consumables comprising:
      a proximal portion shaped to connect to the plasma arc torch and define a gas inlet region, wherein the gas inlet is fluidly connected to the substantially constant preset gas supply;
      a distal portion shaped to define a gas outlet, wherein the gas outlet is fluidly connected to the gas inlet by at least one flow path, the flow path including at least the gas inlet, the gas outlet, and a pressure matching stage, the pressure matching stage defined between the gas inlet and gas outlet, the pressure matching stage the pressure-matching stage comprising a pressure wall and at least one metering hole;
      wherein the at least one metering hole and the pressure wall are configured to reduce a cross sectional flow area of the at least one flow path, thereby establishing sufficient fixed pressure drop of a flow of gas flowing through the pressure-matching stage to reduce the substantially constant preset gas supply pressure of the flow of gas to the predetermined plenum pressure.

* * * * *